United States Patent [19]

Akuzawa

[11] Patent Number: 5,101,287
[45] Date of Patent: Mar. 31, 1992

[54] OPTICAL DOCUMENT READER

[75] Inventor: Yoshihide Akuzawa, Shizuoka, Japan

[73] Assignee: Tokyo Electric Co., Ltd., Tokyo, Japan

[21] Appl. No.: 557,092

[22] Filed: Jul. 25, 1990

[30] Foreign Application Priority Data

Jul. 27, 1989 [JP] Japan ............................ 1-195060

[51] Int. Cl.⁵ ............................................. H04N 1/04
[52] U.S. Cl. ................................... 358/496; 358/488; 358/474; 355/235; 355/233
[58] Field of Search ............... 358/471, 474, 488, 498, 358/496; 355/235, 233; 74/429.8 A

[56] References Cited

U.S. PATENT DOCUMENTS

| | | | |
|---|---|---|---|
| 3,541,580 | 11/1968 | Saito | 358/474 |
| 4,809,086 | 2/1989 | Horiya | 358/498 |
| 4,862,218 | 8/1989 | Tsunoda et al. | 355/235 |
| 4,916,483 | 4/1990 | Thompson et al. | 355/75 |

*Primary Examiner*—Edward L. Coles, Sr.
*Assistant Examiner*—Edward Lefkowitz
*Attorney, Agent, or Firm*—Oblon, Spivak, McClelland, Maier & Neustadt

[57] ABSTRACT

An optical document reader which uses a document keeper to hold a document in place on a document table and which moves an optical unit in the secondary scanning direction along a shaft for optically reading the document. The shaft is supported by a support member which rotates around one end of a support shaft and along the document table. The support member, externally rotated by an adjusting mechanism, is rotatably released by a clutch mechanism. A support member returning mechanism returns the support member to its home position when the member is rotatably released by the clutch mechanism. If the side edge of the document is inclined against that of the document table, the adjusting mechanism rotates the support member to align the optical unit with the document in the secondary scanning direction. When the clutch mechanism rotatably releases the support member afterwards, the support member returning mechanism accurately returns the member to its home position.

2 Claims, 5 Drawing Sheets

OPTICAL DOCUMENT READER

FIELD OF THE INVENTION AND RELATED ART STATEMENT

The present invention relates to an optical document reader which optically reads information from a document and which is illustratively used in an image reader and copier. More particularly, the present invention relates to an optical document reader designed to correct reading errors resulting from the misalignment of the document as it is set therein.

There are prior art optical document readers which are typically used in a copier or the like and which employ a vertically liftable document keeper on top of their document table to keep the document in place thereon by pressure. An optical unit located opposite to the bottom of the document table is guided by shaft or the like in the secondary scanning direction so as to read images from the document.

Some disadvantages of the above-described type of optical document reader are as follow. To use one such optical document reader requires lifting the document keeper to its release position, putting a document on the document table, and placing the document keeper to its set position to keep the document in place. One disadvantage of this setup is that when the document keeper is pressed onto the document whose movement is not restricted, the side edge of the document may become out of alignment with the side edge of the document table. The disrupted parallelism prevents the optical unit from reading the document orthogonally in the secondary scanning direction. The trouble is that another attempt to set the document correctly involves exactly the same process. This means that the second attempt to align the document can result in the same document misalignment as in the first attempt. There is a possibility that a plurality of attempts are needed to set the document correctly. The whole process is inconvenient, time-consuming and tiresome.

One solution to this problem is the use of a scheme wherein the data read from the document is stored in a host computer memory and retrieved therefrom for image processing such as coordinate transformation by rotation. One disadvantage of this scheme is that it requires increasing the memory size of the host computer, which means the system price can be high.

OBJECT AND SUMMARY OF THE INVENTION

It is therefore an object of the present invention to provide an optical document reader which readily corrects any misalignment between the side edge of a document placed on a document table and the side edge of the table so that an optical unit orthogonally reads the document while moving in the secondary scanning direction.

It is another object of the present invention to provide an optical document reader which corrects document misalignment on the document table using a mechanical construction of low manufacturing cost.

It is a further object of the present invention to provide an optical document reader which accurately returns to home position a rotating support member for correcting document misalignment on the document table.

In carrying out the invention, there is provided an optical document reader which uses a document keeper to keep the document in place by pressure on a transparent document table and which moves an optical unit along a shaft parallel to the document table for reading the document in the secondary scanning direction. The optical document reader comprises a support member which supports the shaft and which rotates around one end of a support shaft and in parallel with the document table; an adjusting mechanism having a movable member and an adjusting operation section, the movable member being connected to the support member for the rotation thereof, one end of the adjusting operation section being connected to the movable member and the other end thereof being located outside the reader body; a clutch mechanism comprising a clutch and a clutch operation section, the clutch rotatably releasing the support member, one end of the clutch operation section being connected to the clutch and the other end thereof being located outside the reader body; and a support member returning mechanism for returning the support member to its home position when the support member is rotatably released by the clutch mechanism. If the side edge of the document fails to align with the side edge of the document table, the adjusting operation section is operated to move the movable member so as to rotate the support member that supports the shaft. This action relatively corrects the disrupted parallelism of the shaft with respect to the side edge of the document table, thereby making the shaft parallel to the side edge of the document. This inclination-adjusted shaft is used to guide the optical unit correctly in the secondary scanning direction relative to the document. No matter which direction the support member is rotated in, the clutch operation section is used to release the support member rotatably. This allows the support member returning mechanism to accurately return the support member to its home position.

Furthermore, the adjusting mechanism comprises a pair of pinching members and an actuating member. The pinching members pinch both a projection fixed to the support member and a stopper fixed to the reader body by use of a fulcrum shaft located in the middle of the projection and the stopper. The actuating member actuates the pinching members in the direction of pushing the stopper so that the support member moves opposite to the rotating direction of the stopper. In this setup, having the adjusting mechanism rotate the support member causes the actuating member to actuate the pinching members which in turn push the stopper, thereby actuating the support member in the direction opposite to that of the rotating stopper. In this state, the clutch operation section is used to rotatably release the support member so that the member is forced back in the opposite direction of the rotating stopper. When the pinching members come into contact with the stopper, the returning motion of the support member stops. This is precisely the home position of the support member.

DESCRIPTION OF PREFERRED EMBODIMENT

Figure 7:
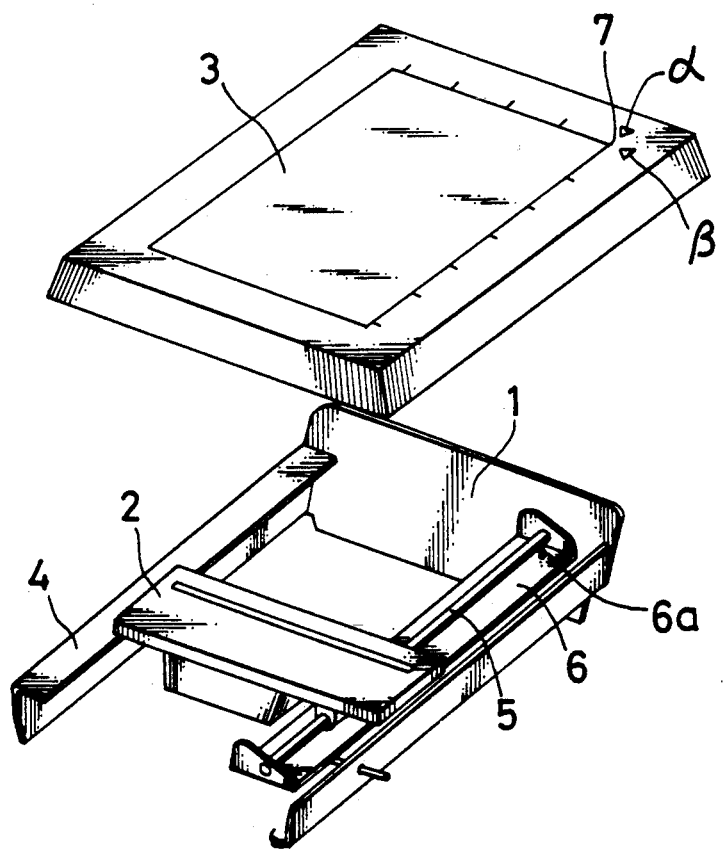
FIG. 7 is an exploded perspective view illustrating how an optical unit of the embodiment is supported.

A preferred embodiment of the present invention will now be described by referring to the accompanying drawings. As shown in FIG. 7, a frame 1 of the reader body (whose whole view is not shown) has an optical unit attached to a document table 3 in a reciprocally movable manner. On one side of the frame 1 is a bent rail 4 that slidably supports one end of the optical unit 2. On the other side of the frame 1 is a plate-shaped support member 6 that supports a shaft 5. The other end of the optical unit 2 is slidably engaged with the shaft 5. The support member 6 is positioned so as to be horizontally rotatable around a support shaft 6a immediately below a reading start position 7 of the document table 3, the position 7 being the origin for a primary scanning direction α and a secondary scanning direction β.

Figure 1:
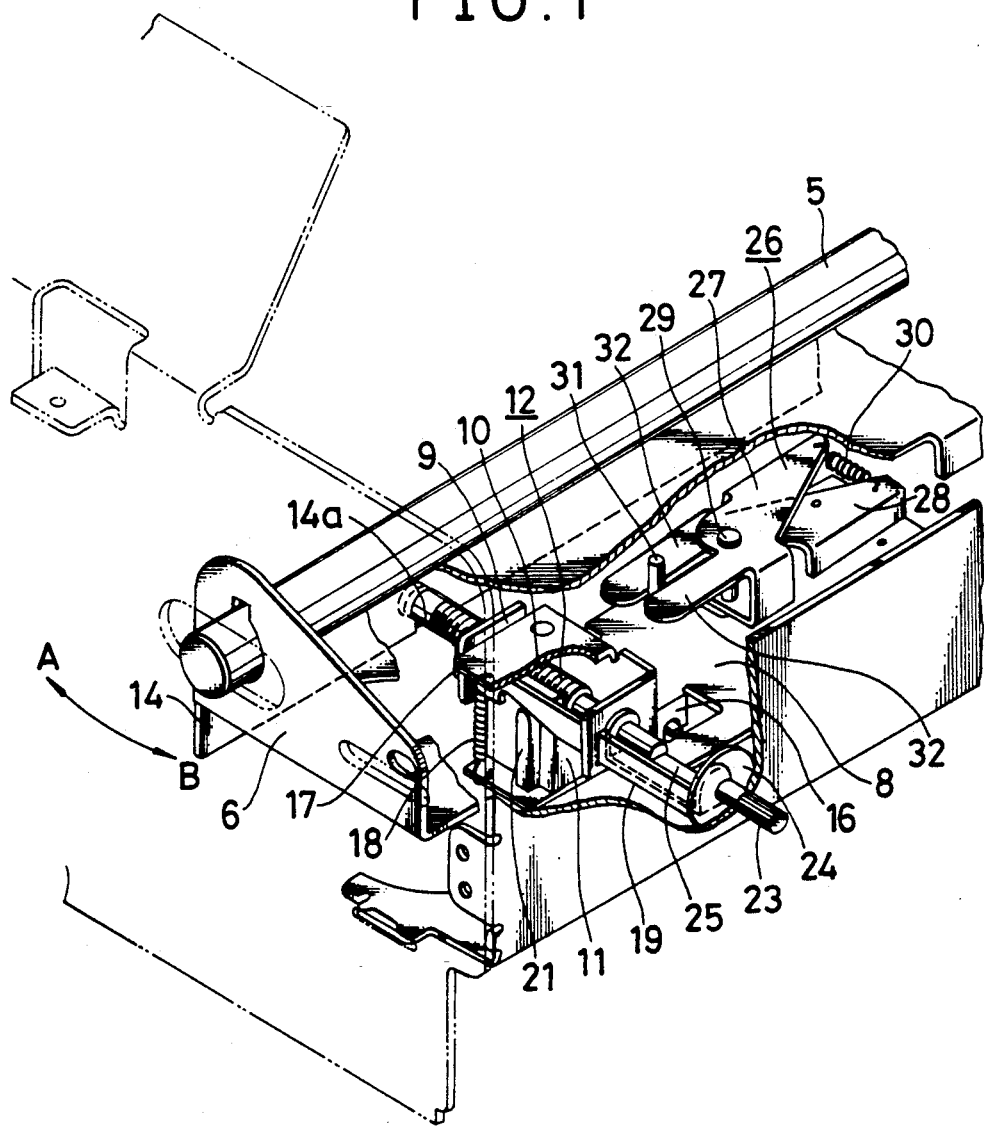
FIG. 1 is a perspective view of a preferred embodiment of the present invention, the perspective including a broken view revealing the construction of an adjusting mechanism, a clutch mechanism and a support member returning mechanism as parts of the embodiment.
Figure 2:
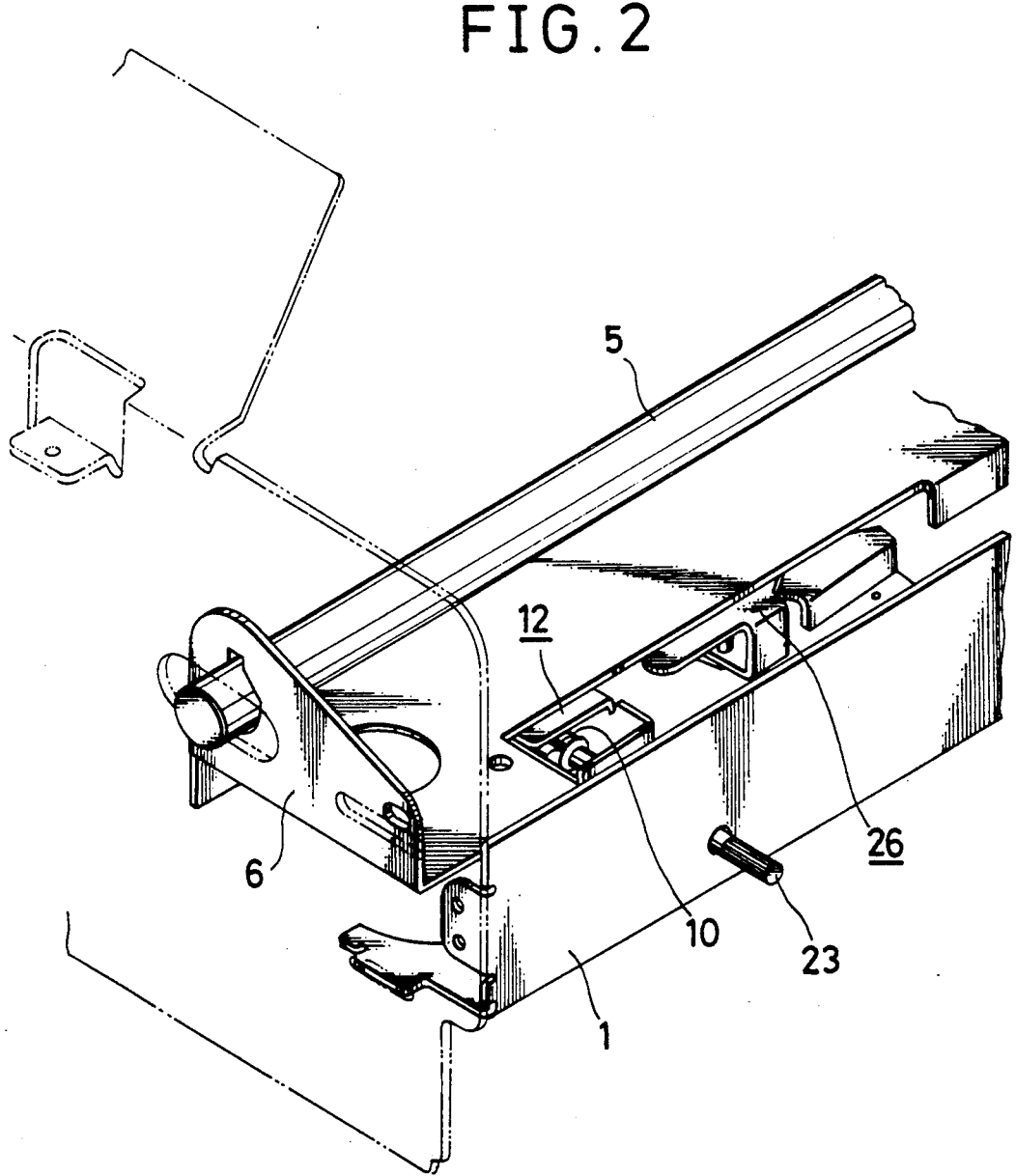
FIG. 2 is a perspective view of the embodiment without the broken view of FIG. 1.
Figure 3:
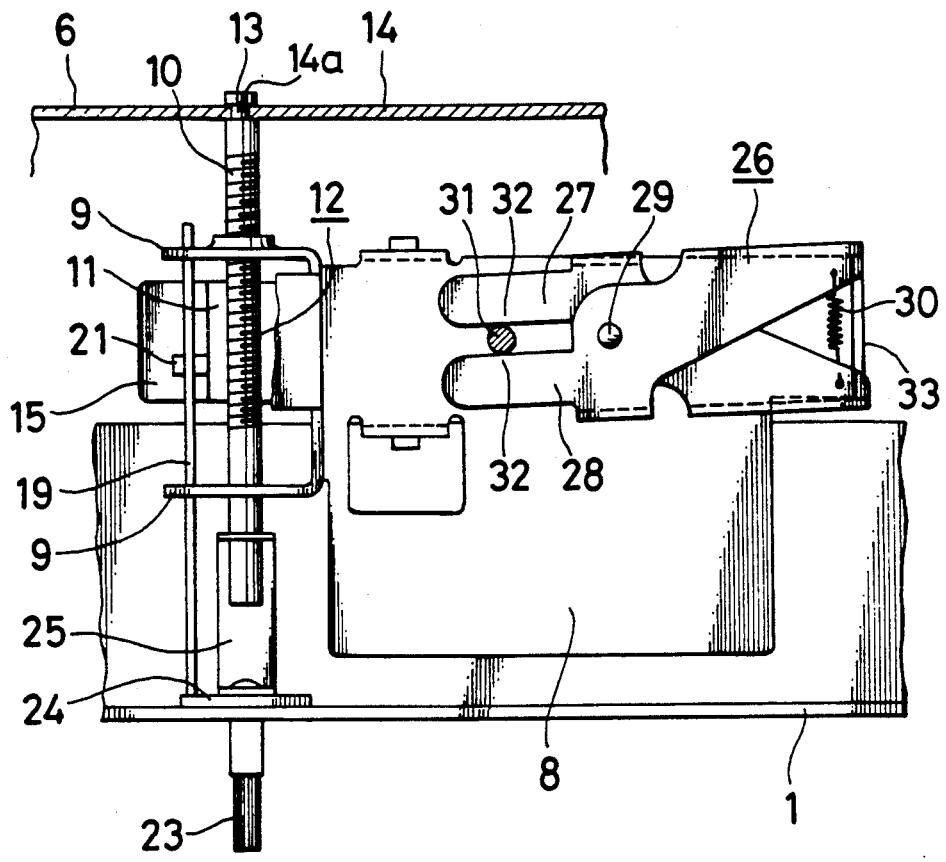
FIG. 3 is a plan view principally showing the construction of the support member returning mechanism.
Figure 4:
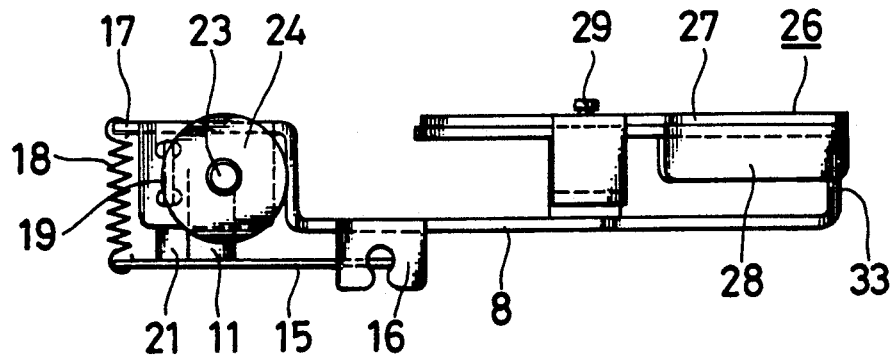
FIG. 4 is a front view of the parts shown in FIG. 3.

FIG. 1 shows major parts of the embodiment in perspective, and FIG. 3 depicts these parts in plan view format. As shown in these figures, the frame 1 is fixedly equipped with a plate 8 located under the support member 6. The plate 8 has a pair of bent members 9 with which a screw 10 (movable member) is engaged rotatably, slidably and axially. The screw 10 is screwed in a nut 11 whose top portion is about three fourths open. The screw 10 and the nut 11 constitute an adjusting mechanism 12. One end of the screw 10 has a groove 13 engaged with a notch 14a of the bent member 14 formed on the support member 6. As illustrated in FIG. 4, one end of a movable plate 15 supporting the nut 11 is flanked and supported in a vertically rotatable manner by a bent member 16 of the plate 8. The movable plate 15 is actuated upwards by a spring installed between spring hooks 17 of the plate 8. The actuating motion in turn pushes the nut 11 against the screw 10.

Figure 5:
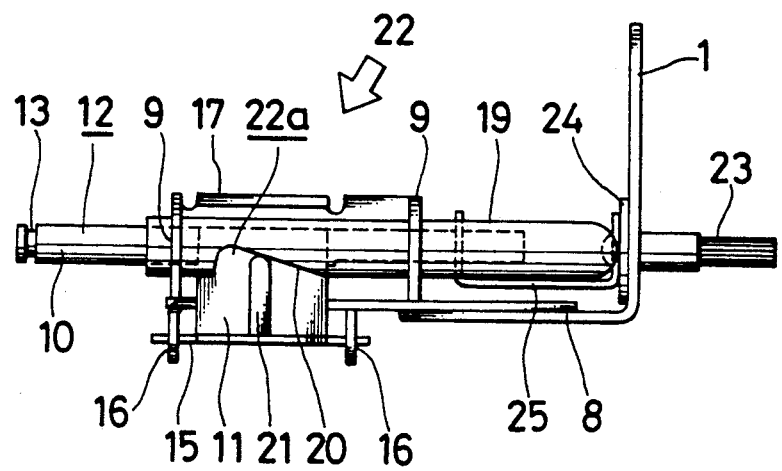
FIG. 5 is a side view of the construction of the clutch mechanism.
Figure 6:
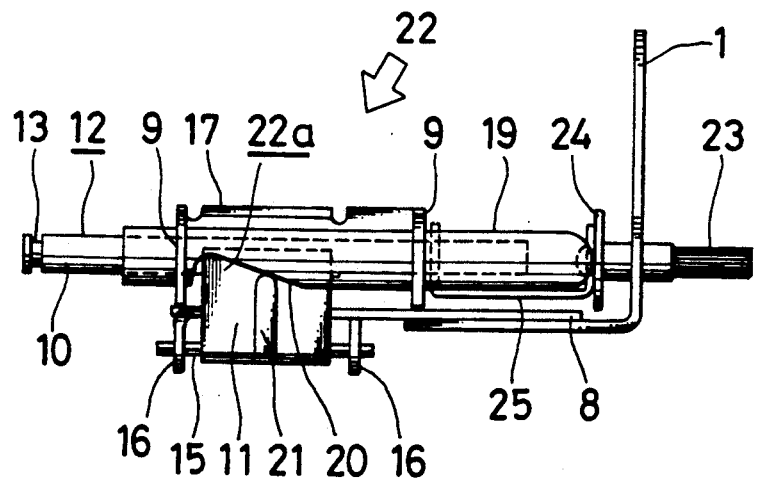
FIG. 6 is a side view depicting how a movable member of the embodiment is released by the clutch mechanism.

As shown in FIGS. 5 and 6, a sliding plate 19 is slidably supported parallel to the screw 10 by the bent member 9 of the plate 8. The nut 11 has on its side a projection 21 contacting a slope 20 formed under the lower edge of the sliding plate 19. One side of the frame 1 is engaged with an operating shaft 23 rotatably and in an axially slidable manner, the shaft 23 being positioned in the axial center of the screw 10 and serving both the adjusting operation section and clutch operation section. One end of the operating shaft 23 projects out of the frame 1 and hence out of the reader body, the other end thereof having a flange 24 contacting one end of the sliding plate 19. As depicted in FIGS. 1 and 3, a connecting plate 25 is fixedly mounted on the flange 24. One end of the screw 10 having a D-shaped cross section is stopped rotatably and in an axially slidable manner by the connecting plate 25. The nut 11, movable plate 15, spring 18, sliding plate 19, flange 24 and connecting plate 25 constitute a clutch 22a. The clutch 22a and the operating shaft 23 make up a clutch mechanism 22.

As illustrated in FIGS. 1 and 3, the plate 8 has a support member returning mechanism 26 that returns the support member 6 to its home position. In the support member returning mechanism 26, a pair of levers (pinching members) 27 and 28 are rotatably crossed in the rotating direction of the support member 6, the two levers being connected by and around a fulcrum shaft 29 to form an X shape. One end of each of the levers 27 and 28 is equipped with a tension spring 30 acting as an actuating member. The other ends of the levers 27 and 28 make up a pinching part 32 that pinches a shaft 31 projecting from the support member 6. The levers 27 and 28, actuated by the tension spring 30, are defined in terms of their stopping position by a stopper 33 located at an end of the plate 8.

In the above-described construction, a document keeper, not shown, is raised to let a document be placed on the document table 3. The document keeper is then replaced to keep the document in place by pressure. The optical unit 2 is guided along the rail 4 and shaft 5 to read images from the document in the secondary scanning direction. If the copied images are found to be inclined, that means document misalignment with respect to the document table 3. That is, the document is not positioned properly. In that case, the operating shaft 23 is rotated clockwise or counterclockwise as needed. The rotating force is transmitted via the connecting plate 25 to the screw 10 so that the screw 10 moves axially along the threads of the nut 11. This causes the support member 6 along with the shaft 5 to rotate in direction A or B, as shown in FIG. 1. The movement adjusts the inclination of the shaft 5 relative to the side edge of the document table 3. That is, the shaft 5 becomes parallel to the side edge of the document not aligned properly with the document table 3. Because the document and the optical unit 2 are properly oriented in the secondary scanning direction, there is no need to raise the document keeper and set the document again for realignment. At this point, the shaft 31 moves as the support member 6 rotates. This causes the shaft 29 to force either of the levers 27 and 28 to rotate, expanding the tension spring 30. The other lever 27 or 28 comes into contact with the stopper 33 and stops there.

When the operating shaft 23 is axially pushed, the flange 24 of the shaft 23 slidably moves the sliding plate 19, with the slope 20 pushing down the projection 21 of the nut 11. This causes the movable plate 15, as shown in FIG. 6, to rotate downward in defiance of the contracting force of the spring 18 around the bent member 16 of the plate 8 as the fulcrum. The rotating motion detaches the nut 11 from the screw 10. Because the support member 6 is thus released from the mechanical resistance of the nut 11, the lever 27 or 28 returns while allowing the tension spring 30 to push the shaft 31. In this manner, the support member 6 returns to its home position (where the shaft 5 is parallel to the side edge of the document table 3).

As indicated, document misalignment on the document table is corrected by adjusting the optical unit 2 in the secondary scanning direction, the unit returning to its home position after the correction. These actions are initiated simply by handling the operating shaft 23 from outside the reader body. The operation is easy to perform. Since all corrective motions are implemented with a simple mechanical construction, the optical document reader as a whole can be manufactured at a reasonable, low cost. In addition, the support member returning mechanism 26 accurately returns the optical unit 2 to its home position.

It is to be understood that while the invention has been described in conjunction with a specific embodiment, it is evident that many alternatives, modifications and variations will become apparent to those skilled in the art in light of the foregoing description. Accordingly, it is intended that the present invention embrace all such alternatives, modifications and variations as fall within the spirit and scope of the appended claims.

What is claimed is:

1. An optical document reader comprising:
   a transparent document table on which a document is held in place by a document keeper;
   an optical unit which is located under said document table and which optically reads information from said document;
   a shaft for slidably supporting said optical unit in its secondary scanning direction;
   a support member which supports said shaft and which rotates around one end of a support shaft and in parallel with said document table;
   an adjusting mechanism having a movable member and an adjusting operation section, said movable member being connected to said support member for the rotation thereof, one end of said adjusting operation section being connected to said movable member and the other end of said section being located outside the body of said optical document reader;
   a clutch mechanism comprising a clutch and a clutch operation section, said clutch rotatably releasing said support member, one end of said clutch operation section being connected to said clutch and the other end of said section being located outside said reader body so that said clutch is operated from the outside; and
   a support member returning mechanism for returning said support member to its home position when said support member is rotatably released by said clutch mechanism.

2. An optical document reader according to claim 1, wherein said adjusting mechanism comprises a pair of pinching members and an actuating member, said pinching members pinching both a projection fixed to said support member and a stopper fixed to said reader body by use of a fulcrum shaft located in the middle of said projection and said stopper, said actuating member actuating said pinching members in the direction of pushing said stopper so that said support member moves opposite to said rotating direction.

* * * * *